United States Patent
Dörner

(10) Patent No.: US 6,278,350 B1
(45) Date of Patent: Aug. 21, 2001

(54) HOLDING DEVICE FOR WORKPIECES IN THE FORM OF EVEN METAL SHEETS

(75) Inventor: Reiner Dörner, Eppingen (DE)

(73) Assignee: Schuler Automation GmbH & Co., KG, Hessdorf (DE)

( * ) Notice: Subject to any disclaimer, the term of this patent is extended or adjusted under 35 U.S.C. 154(b) by 0 days.

(21) Appl. No.: 09/349,019

(22) Filed: Jul. 7, 1999

(30) Foreign Application Priority Data

Sep. 5, 1998 (DE) .............................................. 198 40 612

(51) Int. Cl.[7] .............................. H01F 7/20; H01F 7/04; B25B 11/00
(52) U.S. Cl. ..................... 335/289; 335/290; 335/295; 269/8
(58) Field of Search .................................. 335/285–295; 269/8

(56) References Cited

U.S. PATENT DOCUMENTS

| | | | |
|---|---|---|---|
| 137,875 | * 5/1873 | Jaques et al. | 335/289 |
| 2,561,769 | * 7/1951 | Anderson | 335/289 |
| 3,829,805 | * 8/1974 | Spodig | 335/289 |
| 4,023,267 | * 5/1977 | Pignataro | 29/416 |
| 4,777,463 | * 10/1988 | Cory et al. | 335/289 |

FOREIGN PATENT DOCUMENTS

| | | |
|---|---|---|
| 959977 | 3/1957 | (DE) . |
| 268418 | 5/1989 | (DE) . |
| 4026156 | 5/1991 | (DE) . |
| 19617179 | 11/1996 | (DE) . |
| 19548618 | 8/1997 | (DE) . |

* cited by examiner

*Primary Examiner*—Ramon M. Barrera
(74) *Attorney, Agent, or Firm*—Browdy and Neimark

(57) ABSTRACT

A holder device for workpieces in the form of even or flat metal sheets of a magnetically attractable material, which are to be welded together along a connecting path at edges thereof. The holder device forms a support face for the sheets to rest on. The support face is divided up into a plurality of face parts, which are respectively formed by a separate pole plate of magnetizable material. Each pole plate is provided with an independently magnetically activatable and de-activatable magnet apparatus, which is located underneath the respective pole plate on a support plate arrangement.

15 Claims, 3 Drawing Sheets

HOLDING DEVICE FOR WORKPIECES IN THE FORM OF EVEN METAL SHEETS

BACKGROUND OF THE INVENTION

The invention relates to a holder device for workpieces in the form of metal sheets of magnetically attractable material whose edges are to be welded along a connecting path, comprising a magnetically activatable and de-activatable support face means for supporting the workpieces which are to be welded together.

PRIOR ART

In the automotive industry for example comparatively large pieces of sheet metal are required, which are converted in presses into the respective automobile parts. More particularly they are to have regions with different thicknesses for adaptation to loads occurring in the finished automobile part, such sheets are made up of individual smaller metal sheets, which are joined together at the edges by welding. Conventional thicknesses of sheet metal employed here are in a range of approximately 0.5 to 2.5 mm.

For this purpose in addition to mechanical clamps, with the aid of which the individual pieces of sheet metal are held in the positions for welding, it is a known practice to lay the various sheets on a magnetically activatable support face means while same is not magnetically activated, which after positioning of all sheets is magnetically activated so that the sheets are held on the support face means by magnetic force. After this the sheets are then welded together more especially by laser welding along the respective connecting path.

In such operations there is always a possibility of the first sheet, which has been placed on the support, being knocked aside by the next sheet to be put in place out of the intended setting so that the first sheet must be aligned again. This danger becomes even more serious because the individual sheets must be as close together as possible in order to prevent the formation of a gap which is to be avoided for the welding operation.

SHORT SUMMARY OF THE INVENTION

Accordingly one object of the present invention is to provide a holding device of the initially described type with which positioning of the individual metal sheets in relation to one another is facilitated.

In order to achieve these and/or other objects appearing from the present specification, claims and drawings, in the present invention the support face means is divided up into a plurality of face means fractions which are each constituted by a separate pole plate of magnetizable material, each pole plate having associated with it only an activatable and de-activatable magnet means, which is located underneath the pole plate on a support plate arrangement.

Using the holding device of the invention the following operation becomes possible:

On placing the first sheet in position all magnet means are still inactive. Once the first sheet has been placed in the correct position, those magnet means are activated, which are associated with the pole plates completely covered by the first plate. The first sheet is then held firmly in position owing to the magnetic force exerted on it. After this the next sheet is placed on top, may be thrust at the connecting path against the edge of the first sheet, which, which is already held fast and can not be dislodged. Then the magnet means underneath the second sheet and underneath the connecting path are activated. If further individual sheet are present, same may then be added in the same fashion.

Accordingly it is possible for the individual sheets to be rapidly and truly positioned.

It is convenient for the pole plates to be detachably connected with the support plate arrangement. This involves the following advantage:

In the support face means it is necessary for a groove to be provided extending along the respective connecting path so that the sheet edges to be welded together are exposed in a downward direction. Without such a groove there would be a danger of the two sheets not only being welded to one another but also to the support face means.

It may also be necessary for other recesses to be provided in the support face means, as for example in connection with the putting in place and removal of the workpieces.

If, as in the case of this type known system, of a continuous single-piece support face means, same must consequently be replaced completely on re-tooling the holding device, when sheets are to be welded together having different peripheral shapes so that the at least one groove present so far and the any other recesses present disappear and a number, equal to the number of new sheets, of grooves and possibly recesses must be produced. In comparison the holding device of the invention it is sufficient to replace only the pole plates having the grooves and possibly other recesses. All other pole sheets may continue to be utilized..

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION.

Figure 2:
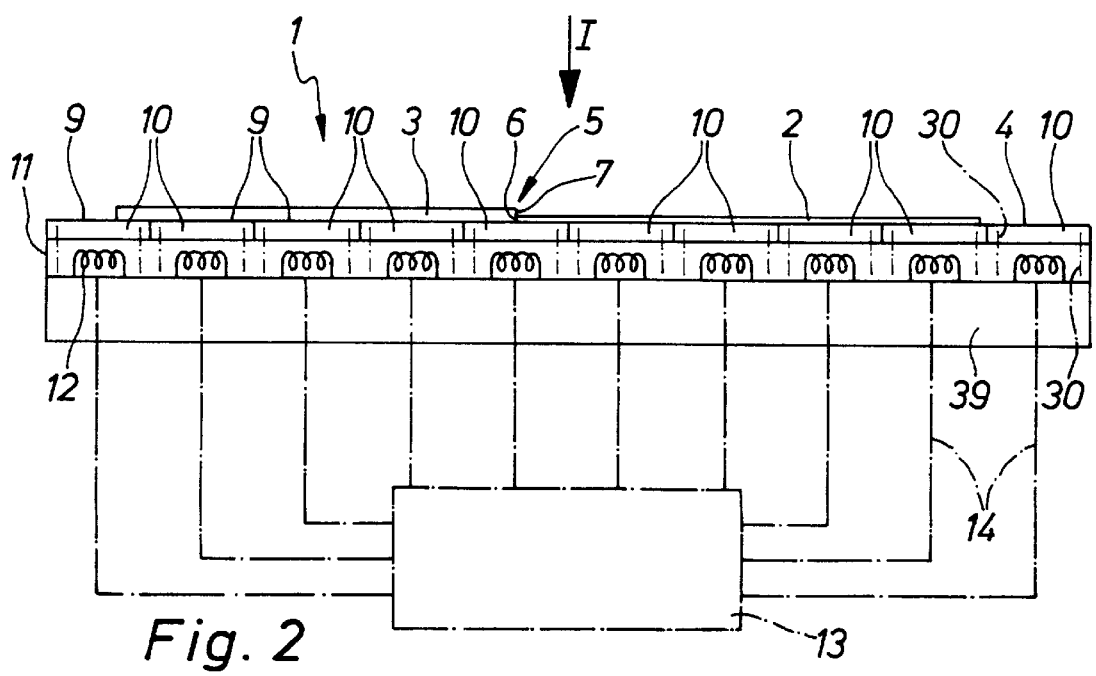
FIG. 2 shows the arrangement of FIG. 1 in a diagrammatic side view as indicated by the arrow II.

The holding device indicated in the drawing serves for holding workpieces 2 and 3 in the form of even or flat metal sheets of magnetically attractable material during welding together at the edges thereof. In the drawing two such individual sheets 2 and 3 are indicated, which after welding together constitute a coherent sheet with a large area. The two sheets 2 and 3 may, as shown in FIG. 2, have a different thickness of their material, but in principle they could however be of equal thickness. The peripheral configuration of the individual sheets 2 and 3 is not in any way limited and will be dependent on the shape of the multi-component sheet produced.

The thickness of the material will normally be in a range between 0.5 and 2.5 mm so that it is a question of comparatively thin sheet metal.

A preferred application of such multi-part sheets is to be found in the automotive industry. Here they are formed in presses to yield the desired automotive components. If the individual sheets 2 and 3 possess a different thickness, the resulting assembled or multi-part sheet will have regions of different thickness, the arrangement being so made that the regions with a greater wall thickness correspond to portions of the finished part which are subject to greater mechanical loading.

The holding device 1 forms an even support face means 4, on which the individual sheets 2 and 3—it may be a question of more than two such sheets—are positioned so that along a connecting path 5, following which they are to be welded together, they have their edges 6 and 7 abutting against one another. As illustrated this connecting path may be straight. The edges 6 and 7 and accordingly the connecting path may, as illustrated, be straight. The edges 6 and 7 and accordingly the connecting path could however be made with a different shape.

The welding together of the sheets 2 and 3 is carried out, as is conventional, using a laser, i.e. from the face turned away from the support face means 4. In order to prevent the sheets 2 and 3 being welded to the support face means 4, underneath the connecting path 5 a suitable groove 8 is formed extending at least along the length thereof so that the sheet edges 6 and 7 are free in a downward direction and do not contact the support face means 4.

The support face means 4 is divided up into a plurality of face parts 9. In order to render the drawing more straightforward only a few of the face parts have lead lines for the reference numeral 9. Each of the face parts 9 is constituted by a separate pole plate 10 of magnetizable material, only some of the pole plates 10 being provided with the reference numeral 10.

Each pole plate 10 has its own magnet means 12, which may be activated and de-activated selectively. Each magnet means 12 is best constituted by at least one electrical winding, two windings 12a and 12b being provided in the case of the working example. In FIG. 2 the magnet means 12 are merely indicated symbolically by a single winding or coil.

The magnet means 12 are located underneath the pole plates 10 on a support plate arrangement 11 consisting of magnetizable material, such support plate arrangement being formed by a support plate extending beneath all the pole plates 10. In principle the support plate arrangement could be designed so as not to be continuous below all the pole plates 10 and be divided up into individual sections.

Figure 4:
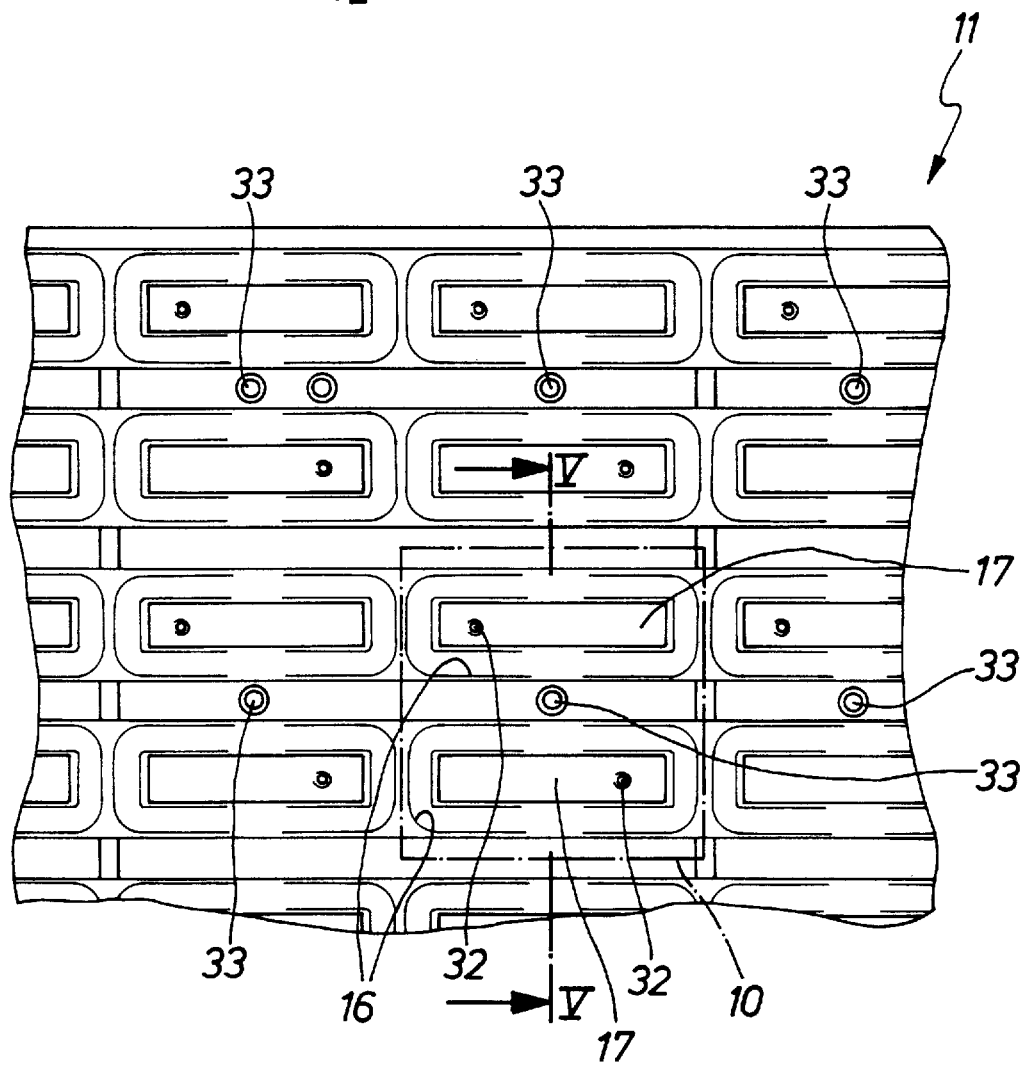
FIG. 4 shows the support plate arranged underneath the pole plates in a partial view, the position of a pole plate being indicated in chained lines.

The support plate 11 has annularly extending recesses 16 in it, which are cut into the plate 11 from its top side facing the pole plates 10 (such top side facing the reader in FIG. 4), such recesses each receiving a winding 12a and 12b. The lands left standing of the support plates constitute magnet armatures 17 extending as far as the top side of the support plate 11, such magnet armatures being arranged within the windings 12a and 12b, and projecting magnetic yokes 18 adjacent to the windings 12a and 12b.

If an electric current is caused to flow through the windings 12a and 12b arranged underneath the respective pole plates 10 respective electromagnets will be formed so that respective magnet means 12 and accordingly the associated pole plate 10 as well will be magnetically activated. Any part resting on the pole plate 10 and made of magnetically attractable material, and more particularly of iron, like the sheets 2 and 3, will then be attracted. In the state free of current of the respective windings the respective magnet means 12 is on the contrary de-activated so that the corresponding pole plate 10 is magnetically neutral and does not exert any magnetic force.

Figure 3:
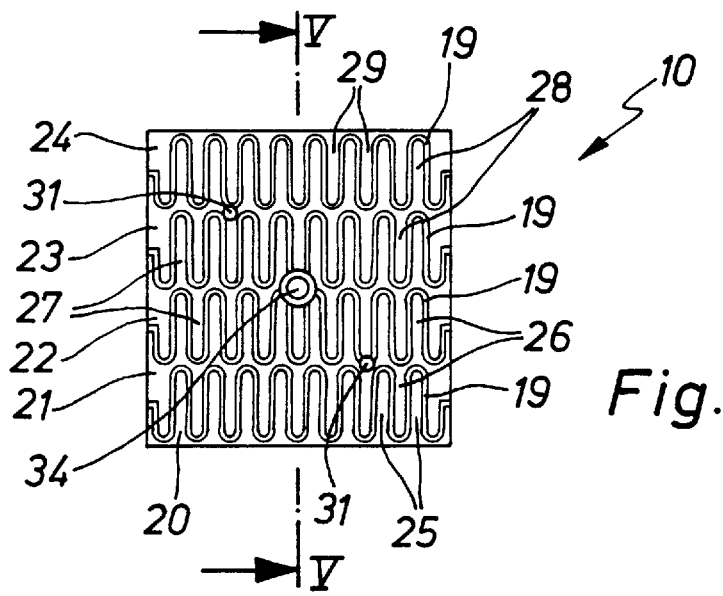
FIG. 3 shows a single pole sheet in plane view.

The magnet armatures 17 and the magnet yokes 18 alternatively form magnetic north and south poles on the top side of the support plate 10. The pole plates 11 are divided respectively into pole plate segments 20, 21, 22, 23 and 24 magnetically separated from one another (in the working example five such pole plate segments are present), which alternatively rest on a north pole and a south pole of the support plate 11 so that respectively adjacent pole plate segments have opposite polarities. In order to have particularly long slots 19 and thus to produce a particularly strong magnetic force, the pole plate segments 20 through 24 constitute comb-like rows of finger-like projections 25, 27, 28 and, respectively, 29. The pole plate segments 20 through 24 have their comb-like rows of projections in mesh or fitting into one another so that on the top side the structure illustrated in FIG. 3 is produced having slots winding to and fro between the finger-like projections. Owing to their having oblique shapes (see FIG. 5) the finger-like projections extend some distance over the respectively adjacent pole plate segments.

The slots 19 are filled with a suitable cast material.

The structure of the pole plates 10 made up of the pole plates segments 20 through 24 is the same as the structure of so-called oscillating or alternating pole plates.

The magnet means 12 may be independently operated and accordingly activated with the respectively associated pole plate 10 and, respectively, deactivated and rendered no longer magnetically active. In FIG. 2 a control means 13 common to all magnet means 12 is indicated in chained lines together with a control line arrangement 14 for each magnet means 12 and connecting same with the control means 13. In this respect the magnet means 12 may be ganged together in a programmable manner as groups of magnet means able to be activated simultaneously so that accordingly groups of simultaneously activated pole plates 10 are present.

The electrical line leading to the magnet means 12, that is to say the winding 12a and 12b are arranged within the support plate 11.

Before the sheets 2 and 3 are put in place, all magnet means 12 are de-activated with the result that they become magnetically inactive. Then one of the two plates, for instance the sheet 2, is positioned on the support face means 4 and fixed in place by activation of the magnet means 12, whose pole plates 10 are located underneath the sheet 2. The activation of these magnet means takes place simultaneously, since they are placed in one of the said groups. The pole plates 10 projecting in front of the sheet 2 are not yet activated at this time. After this the other sheet 3 is positioned so that it makes close contact with the sheet 2 along the connecting path. There is then an activation of the pole plates 10, something which again may take place in a group, underneath the sheet 3 and the two sheets 2 and 3 are attracted along the pole plates 10 extending underneath the connecting path 5 with the result that the second sheet 3 is held in the position desired for welding. Any further sheet is then laid in place after fixing of the second sheet 3 and so on.

The pole plates 10 are detachably connected with the support plate 11. It is in this manner that the pole plates 10 may be separately removed from the support plate 11 and, if necessary, replaced by a new pole plate. This is for example an advantage in a case in which the equipment is employed for welding together sheets with different shapes, in the case of which the connecting path runs in a different position, because it is merely necessary to replace the pole plates 10, which lie on the old connecting path 5 and hence and have the groove 8, in order to have a generally "intact" support face means, in which the new connecting path may be formed along the new groove.

The attachment on the pole plates 10 is performed with the aid of attachment screws 30, which respectively fit through a hole 31 in the respective pole plate 10 and are screwed into a threaded hole 32 in the support plate. In the working embodiment there are two attachment screws 30 arranged diametrally opposite to each other on a diagonal for each pole plate 10.

Figure 1:
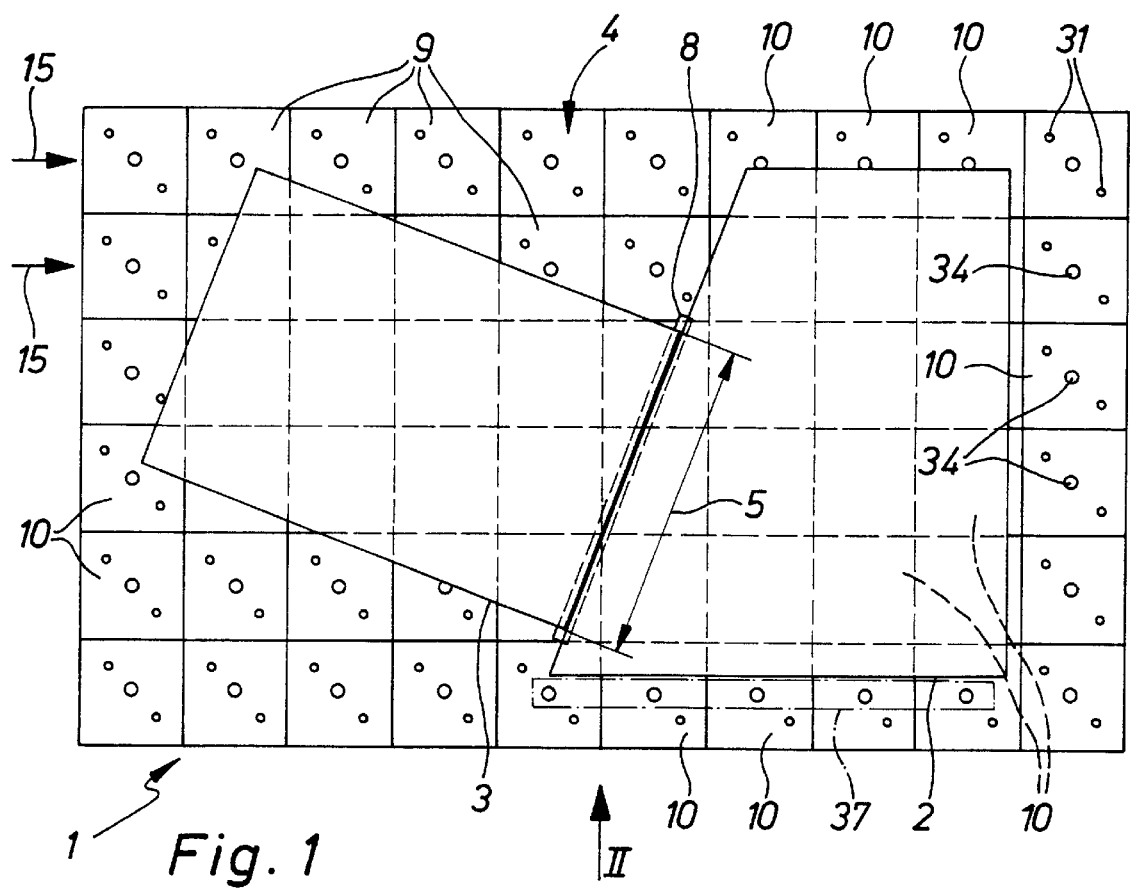
FIG. 1 shows a device in accordance with the invention in a diagrammatic plan view looking in the direction of arrow I in FIG. 2 without the projecting surface structure of the pole plates indicated in FIG. 3, two metal sheets to be joined together having been placed on the support face means.

The pole plates 10 constitute, as indicated in FIG. 1, adjacently placed rows of pole plates 15, of which in FIG. 2 only the two topmost rows are referenced. Here the rows 15 of pole plates are best arranged without any longitudinal offset so that they are also aligned on each other at a right angle to the pole plate rows 15 as well.

It will furthermore appear from the drawings that the support plate 11 has an array of receiving 33 holes therein and the pole plates 10 have corresponding through holes 34. In the illustrated working embodiment the receiving holes 33 are located points of the support plates corresponding to the center points of the pole plates. Accordingly the pole plates 10 respectively possess a central through hole 34. With the aid of such hole array bolts, which are fixed in relation to the support plate 11, may be put in place and employed to center and/or knock the sheets 2 and 3 or to hold centering and/or knocking means for the sheets 2 and 3.

Figure 5:
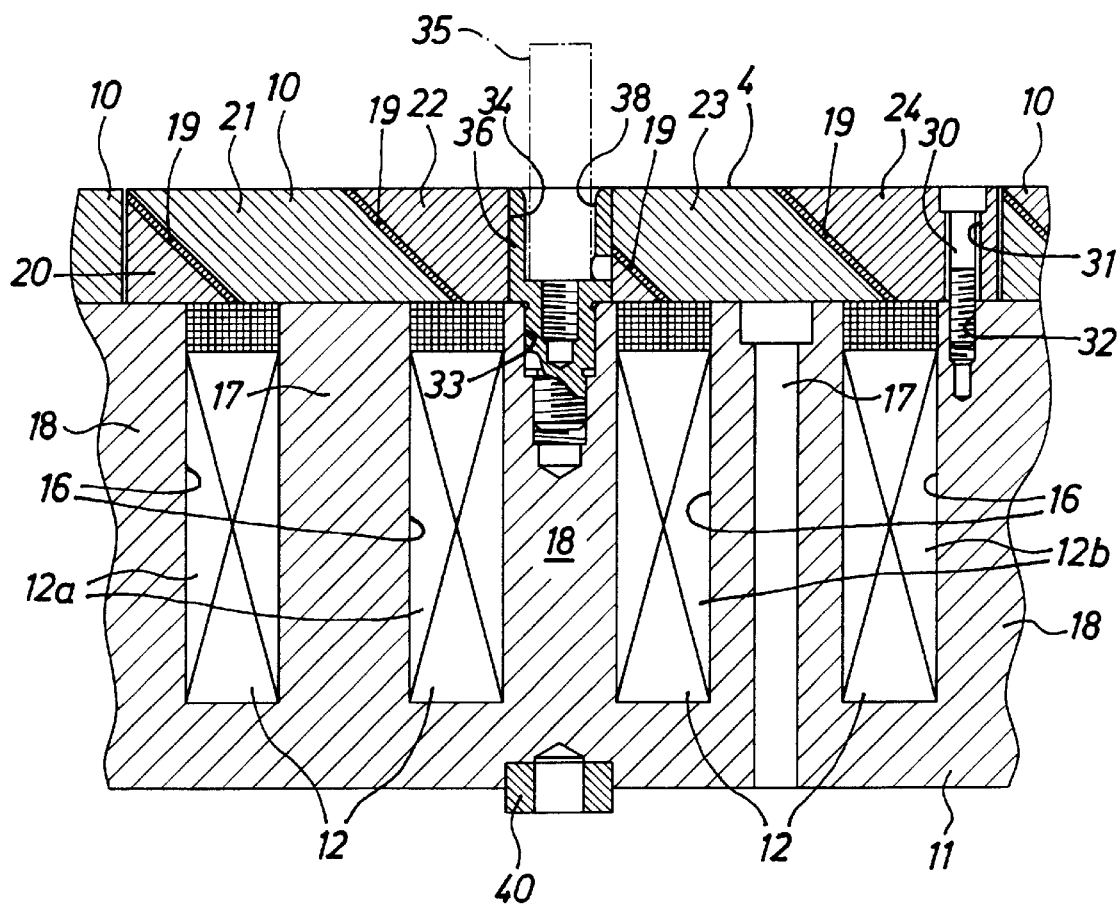
FIG. 5 shows the support plate in accordance with FIG. 4 with the pole plates mounted in accordance with FIG. 3 in a cross section on the section lines V—V in FIGS. 3 and 4 on a larger scale and in part.

FIG. 5 shows such a bolt 35 or stud in chained lines, which stands proud from the respective pole plate 10 with the result that it constitutes an abutment. Moreover FIG. 1 indicates an abutment rule 37 as well in chained lines, which by means of suitable bolts is fixed in relation to the support plate 11.

The respective bolt could be fitted through in the hole 34 in the respective pole plate 10 and set, more particularly by screwing, in the associated receiving hole 33 in the support plate 11. It is however convenient to have permanently mounted receiving bushings 36, or to provide for the possibility of having such bushings, in the receiving holes 33 in the support plate 11, which bushings in the inserted condition stand proud of the respective pole plate 10 or extend therethrough as far as the top side of the pole plate. Such receiving bushings 36 are provided in the working example of the invention. At the end top they comprise a receiving hole 38, into which the respective bolt 35 in the support plate 11 may be inserted and/or screwed.

Such receiving bushings 36 may be provided in all receiving holes 33 at the outset. However they may be omitted and only fitted later in holes where necessary at the positions required, where bolts are to be inserted.

It will furthermore be seen from the drawings that the support plate 11 is seated on a table-like base body 39 and screwed in place thereon. In this respect the support plate 11 may have locating pins 40 or the like on its lower surface, which fit into holes in the base body 39.

What is claimed is:

1. A holder device for workpieces in the form of metal sheets of magnetically attractable material whose edges are to be welded along a connecting path, comprising a magnetically activatable and de-activatable support face means for supporting the workpieces which are to be welded together, wherein the support face means is divided up into a plurality of face means fractions which are each constituted by a separate pole plate of magnetizable material, each pole plate having associated therewith an activatable and de-activatable magnet means, which are located underneath the pole plate on a support plate arrangement;

control means for activating and de-activating each magnet means independently of each other; and wherein the pole plates constitute adjacently extending rows of pole plates.

2. The holder device as set forth in claim 1, wherein the rows of pole plates are arranged free of offset in the longitudinal direction thereof.

3. The holder device as set forth in claim 1, wherein the pole plates are detachably connected with the support plate arrangement.

4. A holder device as set forth in claim 1, wherein said support face means has a groove under the connecting path of the edges of the workpieces to be welded to prevent the workpieces from being welded to the support face means.

5. A holder device for workpieces in the form of metal sheets of magnetically attractable material whose edges are to be welded along a connecting path, comprising a magnetically activatable and de-activatable support face means for supporting the workpieces which are to be welded together, wherein the support face means is divided up into a plurality of face means fractions which are each constituted by a separate pole plate of magnetizable material, each pole plate having associated therewith an activatable and de-activatable magnet means, which are located underneath the pole plate on a support plate arrangement;

control means for activating and de-activating each magnet means independently of each other; and wherein the support plate arrangement is constituted by a support plate extending beneath an entire area of all the pole plates.

6. A holder device for workpieces in the form of metal sheets of magnetically attractable material whose edges are to welded along a connecting path, comprising a magnetically activatable and de-activatable support face means for supporting the workpieces which are to be welded together, wherein the support face means is divided up into a plurality of face means fractions which are each constituted by a separate pole plate of magnetizable material, each pole plate having associated therewith an activatable and de-activatable magnet means, which are located underneath the pole plate on a support plate arrangement;

control means for activating and de-activating each magnet means independently of each other;

wherein the support plate arrangement has on an upper side thereof an array of receiving holes and the pole plates possess corresponding through holes;

bolts being detachably engaged in the receiving holes to project above a top surface of the pole plates to position the workpieces thereon; and wherein the pole plates constitute adjacently extending rows of pole plates.

7. The holder device as set forth in claim 6, wherein the pole plates possess a rectangular or square peripheral shape.

8. The holder device as set forth in claim 6, wherein the support plate arrangement is constituted by a support plate extending beneath the entire area of the pole plates.

9. The holder device as set forth in claim 6, wherein the support plate arrangement comprises recesses formed from its surface facing the pole plates for receiving electrical windings constituting the magnet means and lands left standing therebetween constitute magnet armatures and yokes.

10. The holder device as set forth in claim 6, wherein the receiving holes are arranged at points corresponding to the centers of the pole plates and the pole plates respectively possess a central through hole.

11. The holder device as set forth in claim 6, wherein receiving bushing are respective inserted in each of the receiving holes with a first end extending into the corresponding holes in the pole plates; and wherein the bolts are respectively detachably engaged at a second end of the bushing below a surface of the support plate arrangement.

12. The holder device as set forth in claim 6, wherein the pole plates are detachably connected with the support plate arrangement.

13. The holder device as set forth in claim 12, wherein the rows of pole plates are arranged free of offset in the longitudinal direction thereof.

14. The holder device as set forth in claim 6, wherein the pole plates are respectively divided up into pole plate segments separated magnetically from each other by slots, mutually adjacent pole plate segments having different polarities when the magnet means is activated.

15. The holder device as set forth in claim 14, wherein the pole plate segments form comb-like rows of finger-like projections and fit together owing to mutual meshing of the projections in rows.

* * * * *